US009701845B2

(12) United States Patent
Grüner et al.

(10) Patent No.: US 9,701,845 B2
(45) Date of Patent: Jul. 11, 2017

(54) PIGMENT WITH PHOTOCATALYTIC ACTIVITY, METHOD FOR THE PRODUCTION THEREOF AND COATING AGENT

(71) Applicant: Eckart GmbH, Hartenstein (DE)

(72) Inventors: Michael Grüner, Auerbach (DE); Günter Kaupp, Neuhaus (DE)

(73) Assignee: ECKART GMBH, Hartenstein (DE)

( * ) Notice: Subject to any disclaimer, the term of this patent is extended or adjusted under 35 U.S.C. 154(b) by 0 days.

(21) Appl. No.: 14/440,629

(22) PCT Filed: Nov. 5, 2013

(86) PCT No.: PCT/EP2013/073048
§ 371 (c)(1),
(2) Date: May 5, 2015

(87) PCT Pub. No.: WO2014/072287
PCT Pub. Date: May 15, 2014

(65) Prior Publication Data

US 2015/0291799 A1 Oct. 15, 2015

(30) Foreign Application Priority Data

Nov. 6, 2012 (EP) .................................... 12191492

(51) Int. Cl.

| | |
|---|---|
| ***C09C 1/62*** | (2006.01) |
| ***C09C 3/06*** | (2006.01) |
| ***C09C 1/00*** | (2006.01) |
| ***B01J 37/03*** | (2006.01) |
| ***B01J 21/06*** | (2006.01) |
| ***B01J 23/06*** | (2006.01) |
| ***B01J 23/10*** | (2006.01) |
| ***B01J 35/00*** | (2006.01) |
| ***B01J 35/08*** | (2006.01) |
| ***B01J 35/10*** | (2006.01) |
| ***B01J 37/02*** | (2006.01) |
| ***B01J 21/08*** | (2006.01) |
| ***B01J 23/14*** | (2006.01) |
| ***C09C 1/30*** | (2006.01) |

(52) U.S. Cl.
CPC ............. *C09C 3/063* (2013.01); *B01J 21/063* (2013.01); *B01J 21/08* (2013.01); *B01J 23/06* (2013.01); *B01J 23/10* (2013.01); *B01J 23/14* (2013.01); *B01J 35/002* (2013.01); *B01J 35/004* (2013.01); *B01J 35/0006* (2013.01); *B01J 35/08* (2013.01); *B01J 35/1014* (2013.01); *B01J 37/0203* (2013.01); *B01J 37/024* (2013.01); *B01J 37/031* (2013.01); *C09C 1/003* (2013.01); *C09C 1/0057* (2013.01); *C09C 1/3054* (2013.01); *C01P 2004/20* (2013.01); *C09C 2200/102* (2013.01); *C09C 2200/1004* (2013.01); *C09C 2200/407* (2013.01); *C09C 2210/20* (2013.01); *C09C 2220/106* (2013.01)

(58) Field of Classification Search
None
See application file for complete search history.

(56) References Cited

U.S. PATENT DOCUMENTS

| | | | | |
|---|---|---|---|---|
| 6,113,873 | A | 9/2000 | Tunashima et al. | |
| 7,413,599 | B2 | 8/2008 | Henglein et al. | |
| 8,003,213 | B2 | 8/2011 | Aruga | |
| 8,324,129 | B2 | 12/2012 | Kuntz et al. | |
| 2004/0005466 | A1* | 1/2004 | Arai | B01J 35/002 428/432 |
| 2005/0234178 | A1* | 10/2005 | Andrews | C01B 15/04 524/439 |
| 2009/0056591 | A1* | 3/2009 | Schmidt | C09C 1/0015 106/415 |
| 2010/0022383 | A1* | 1/2010 | Kuntz | C09D 7/1225 502/84 |
| 2010/0075031 | A1 | 3/2010 | Bujard | |
| 2010/0178308 | A1* | 7/2010 | Iwasa | C09C 1/0021 106/415 |
| 2010/0322981 | A1 | 12/2010 | Bujard et al. | |
| 2011/0118384 | A1* | 5/2011 | Bugnon | C09C 1/0021 523/171 |

FOREIGN PATENT DOCUMENTS

| | | | |
|---|---|---|---|
| CN | 101027365 | A | 8/2007 |
| CN | 101092246 | A | 12/2007 |
| CN | 101389713 | A | 3/2009 |
| CN | 101573416 | A | 11/2009 |
| DE | 10 2006 044076 | A1 | 3/2008 |
| EP | 0 289 240 | A1 | 11/1988 |
| EP | 0870730 | A1 | 10/1998 |
| EP | 1 980 594 | A1 | 10/2008 |
| WO | 03/006558 | A2 | 1/2003 |
| WO | 2004/056716 | A1 | 7/2004 |
| WO | 2005/063637 | A1 | 7/2005 |
| WO | 2008034510 | A2 | 3/2008 |
| WO | 2011/095447 | A2 | 8/2011 |

* cited by examiner

*Primary Examiner* — Kaj K Olsen
*Assistant Examiner* — Ross J Christie
(74) *Attorney, Agent, or Firm* — The Webb Law Firm

(57) ABSTRACT

The invention relates to pigments with a non-metallic substrate, wherein the pigments have at least one barrier layer that selectively absorbs light and/or electrons and at least one photocatalytically active layer, wherein the at least one barrier layer is arranged between the non-metallic substrate and the at least one photocatalytically active layer. The invention furthermore relates to a method for producing the pigments and to a coating agent.

21 Claims, No Drawings

PIGMENT WITH PHOTOCATALYTIC ACTIVITY, METHOD FOR THE PRODUCTION THEREOF AND COATING AGENT

CROSS-REFERENCE TO RELATED APPLICATIONS

This application is the United States national phase of International Application No. PCT/EP2013/073048 filed Nov. 5, 2013, and claims priority to European Patent Application No. 12191492.3 filed Nov. 6, 2012, the disclosures of each of which are hereby incorporated by reference in their entireties.

BACKGROUND OF THE INVENTION

Field of the Invention

The present invention relates to pigments with photocatalytic activity, a method for the production thereof and a coating agent.

Description of Related Art

Photocatalytic self-cleaning refers to a property of surfaces which have been coated e.g. with nanoparticles of titanium dioxide ($TiO_2$). Organic materials on the surface are broken down by irradiation with (sun)light. The surfaces stay clean and have an antimicrobial action.

The principle of the photocatalytic effect is based on the semi-conductor properties of titanium dioxide ($TiO_2$). The impingement of light produces electron-hole pairs, provided that the energy of the photons is greater than the band gap Eg (internal photoelectric effect). The electrons or holes can diffuse in the titanium dioxide on the surface and produce radicals there which lead to the breakdown of organic substances. In particular the holes have a highly oxidative action, e.g. OH radicals can be formed in this way even from water. Organic substances are broken down by the formed radicals; in many cases end-products are $CO_2$ and water.

Up to now, self-cleaning surfaces, e.g. on motor vehicle mirrors, self-cleaning or antimicrobially active tiles, as well as photocatalytically active emulsion paints, paving stones, flagstones, exposed concrete, roofing tiles, papers, as well as water treatment and air purification have been described as fields of use for this photocatalytic effect.

In the state of the art, primarily $TiO_2$ particles with widely different degrees of fineness and in particular nanoparticles based on an anatase-$TiO_2$ basis are described for the photocatalysis. For another thing, pearlescent pigments covered with $TiO_2$ (anatase) are also mentioned. WO 2008/034510 A2 relates to a photocatalytically active coating for surfaces which contains commercially available interference pigments as photocatalytically active material.

If $TiO_2$ nanoparticles are used as photocatalytically active material, the possible dangers that accompany them for manufacturers and handlers are also not to be underestimated. It is known that nanoparticulate titanium dioxide can be absorbed by humans both through the lungs and through the skin or the alimentary canal, and can lead to accumulations there. When used in particular on the external surfaces of components of all types, the transfer of substantial amounts of nanoparticles into the groundwater is also not to be ruled out.

When $TiO_2$ particles or $TiO_2$ nanoparticles are used, undesired color phenomena, such as e.g. clouding, scattering or whitening, can occur.

When commercially available pearlescent pigments are used, a significant gloss effect is additionally very often to be observed. Likewise, commercially available pearlescent pigments, depending on the $TiO_2$ proportion in the coating, produce a color effect, so-called interference colors.

A significant disadvantage of $TiO_2$ particles is represented by the problem that the intended photoactivity and the accompanying tendency of titanium dioxide to form radicals cannot distinguish between "friend" and "foe". The $TiO_2$ particles cannot differentiate whether organic components in their surroundings are now to be decomposed or preserved. In other words, as a rule, organic binder systems which come into consideration as matrix or carrier for photocatalytically active $TiO_2$ particles are also radically decomposed. This effect is, naturally, not desired since an achievable action would then only be available in the short-term. Therefore most coatings with photocatalytic activity are currently limited to insensitive, inorganic binder matrices, or are only effective for a short time.

Macroscopically, this expresses itself for example as a strong chalking and makes the use of organic binders almost impossible at present.

SUMMARY OF THE INVENTION

In some examples there is provided a pigment comprising a non-metallic substrate, wherein the pigment has at least one barrier layer that selectively absorbs light and/or electrons and at least one photocatalytically active layer comprising titanium oxide, titanium hydroxide and/or titanium oxide hydrate, wherein the average layer thickness of the photocatalytically active layer is ≤40 nm, wherein the at least one barrier layer is arranged between the non-metallic substrate and the at least one photocatalytically active layer, wherein the barrier layer comprises metal oxide, metal hydroxide and/or metal oxide hydrate, and wherein the metal is selected from the group consisting of cerium, zinc and mixtures thereof.

Also, methods for producing such pigments and coatings comprising such pigments are provided.

DETAILED DESCRIPTION

The object of the present invention is to provide a pigment with photocatalytic activity which can be used universally in all the current application systems, thus also in organic binder systems. In particular, the organic binder system containing the novel pigment with photocatalytic activity is also to be stable over a long period of time, without experiencing any significant harmful decomposition, and in particular without the said binder film and/or the pigment with photocatalytic activity detaching from the coated surfaces because of binder degradation, and thus without the photocatalytically active coating becoming ineffective.

Furthermore, the pigments with photocatalytic activity are, as far as possible, not to be visibly apparent, with the result that there is no or only a slight influence on the coated surfaces.

With a view to preventing health and safety risks for manufacturers, handlers and users, the pigments with photocatalytic activity are not to be nanoparticulate.

The object was achieved by providing pigments with a non-metallic substrate, wherein the pigments have at least one barrier layer that selectively absorbs light and/or electrons and at least one photocatalytically active layer, wherein the at least one barrier layer is arranged between the non-metallic substrate and the at least one photocatalytically active layer.

Preferred developments are specified in dependent claims 2 to 15.

In addition, the object was achieved by providing a method for producing pigments according to the invention, wherein the method comprises the following steps (a) coating a non-metallic substrate with at least one barrier layer, (b) coating the non-metallic substrate provided with at least one barrier layer with at least one photocatalytically active layer.

Furthermore, the object is achieved by using the pigments according to the invention in a coating agent, preferably a varnish or a paint. The pigments according to the invention are therefore suitable for the use according to the invention in a coating agent, such as for example a varnish, in particular a protective wood varnish, a paint or a stain.

By the term "pigments" or "pigment" is meant according to the invention a number of pigments.

By the term "that selectively absorbs light" is meant according to the invention that the absorption does not occur over the whole light spectrum or wavelength spectrum, but rather only a part of the spectrum is absorbed. For example, by "that selectively absorbs light" is meant according to a variant of the invention that only UV light is absorbed. According to the invention the selectively absorbed light preferably induces the photocatalytic activity of the photocatalytically active layer.

A subject of the invention is preferably a varnish, in particular a protective wood varnish, which comprises the pigments according to the invention.

The non-metallic substrates of the pigments according to the invention are preferably transparent, i.e. permeable to visible light, as well as preferably largely free from coloring components which can reduce the lightness L* and/or alter a color shade.

The level of iron or iron compounds in the non-metallic substrates, calculated as elemental iron, preferably lies at less than 1.50 wt.-%, preferably in a range of from 0.01 wt.-% to 0.74 wt.-%, further preferably in a range of from 0.03 wt.-% to 0.36 wt.-% and particularly preferably in a range of from 0.01 wt.-% to 0.18 wt.-%, in each case relative to the total weight of the substrate.

The iron content of the non-metallic substrates is preferably determined via X-ray fluorescence (XRF) analysis. For this, lithium tetraborate is added to the substrates, they are melted in an oxidizing atmosphere and measured as a homogeneous glass tablet. The Advantix ARL device from Thermo Scientific is used as measurement device.

The non-metallic substrates can be present in platelet-shaped or spherical form, preferably the non-metallic substrates are platelet-shaped.

The non-metallic platelet-shaped substrates can be selected from the group consisting of natural mica platelets, synthetic mica platelets, glass platelets, aluminum oxide platelets, silicon dioxide platelets and mixtures thereof. The non-metallic platelet-shaped substrates are preferably selected from the group consisting of natural mica platelets, synthetic mica platelets, glass platelets and mixtures thereof. The non-metallic platelet-shaped substrates are particularly preferably selected from the group consisting of synthetic mica platelets, glass platelets and mixtures thereof. Synthetic mica platelets are quite particularly preferred as substrate.

If synthetic mica platelets are to be used as substrate, within the framework of this invention they are preferably fluorphlogopite of the general formula $KMg_3AlSi_3O_{10}F_2$. In a preferred embodiment synthetic mica platelets are used which, according to X-ray fluorescence analysis, contain silicon dioxide in a proportion from a range of from 38 to 46 wt.-%, aluminum oxide from a range of from 10 to 14 wt.-%, potassium oxide from a range of from 9 to 13 wt.-%, sodium oxide from a range of from 0 to 13 wt.-%, iron(III) oxide from a range of from 0.01 to 0.25 wt.-%, magnesium oxide from a range of from 26 to 34 wt.-%, preferably from a range of from 10 to 30 wt.-%, particularly preferably from a range of from 13 to 27 wt.-%, quite particularly preferably from a range of from 17 to 23 wt.-%, manganese(II) oxide from a range of from 0 to 0.05 wt.-%, in each case relative to the total weight of the synthetic mica platelets.

The level of coloring ions of for example nickel, chromium, copper, manganese and/or antimony ions, calculated in each case as elemental metal, in the synthetic mica platelets in each case preferably lies at less than 15 ppm, further preferably in each case at less than 10 ppm, in each case relative to the total weight of the substrate.

If glass platelets are to be used as substrate, this can preferably have a composition which corresponds to A-glass, C-glass, ECR glass, LAG, Duran glass, quartz glass, E-glass as well as optical glass, window glass or laboratory glass.

The refractive index of the glass flakes lies in a range of from 1.3 to 2.9, preferably in a range of from 1.35 to 2.3 and particularly preferably in a range of from 1.4 to 1.8. The glass platelets preferably have the composition claimed in EP 1 980 594 B1. They can be produced according to the method described in EP 0 289 240 B1, WO 2004/056716 A1 and WO 2005/063637 A1.

The average particle size $D_{50}$ of the non-metallic platelet-shaped substrates preferably lies in a range of from 2 to 65 μm, particularly preferably in a range of from 3 to 50 μm and quite particularly preferably in a range of from 5 to 40 μm.

The average thickness $h_{50}$ of the non-metallic platelet-shaped substrate lies at ≤5 μm, preferably in a range of from 50 to 5000 nm, further preferably from 50 to 1500 nm, particularly preferably in a range of from 80 to 1300 nm, further preferably in a range of from 95 to 1200 nm, still further preferably of from 100 to 1000 nm, still further preferably of from 150 to 750 nm.

If synthetic mica platelets are used as non-metallic platelet-shaped substrate, their average thickness $h_{50}$ preferably lies in a range of from 60 to 1200 nm, further preferably in a range of from 80 to 990 nm, particularly preferably in a range of from 90 to 600 nm and quite particularly preferably in a range of from 95 to 400 nm.

If glass platelets are used as non-metallic platelet-shaped substrate, their average thickness $h_{50}$ preferably lies in a range of from 50 to 5000 nm, further preferably in a range of from 100 to 2500 nm and particularly preferably in a range of from 800 to 1300 nm. Thinner glass platelets offer further advantages. Thinner substrates lead to a smaller total layer thickness of the pigments according to the invention. Thus, glass platelets are likewise preferred, the average thickness $h_{50}$ of which lies in a range of from 70 nm to 700 nm, further preferably in a range of from 120 nm to 600 nm, particularly preferably in a range of from 170 nm to 500 nm and quite particularly preferably in a range 200 nm to 400 nm.

If non-metallic platelet-shaped substrates below an average thickness $h_{50}$ of 50 nm are coated with for example highly refractive metal oxides, extremely fragile pigments are obtained which can break apart even during incorporation into an application medium, which in turn causes a significant reduction in gloss. In addition, the times for coating these thin substrates with, for example, highly refractive metal oxides are very long because of the large specific surface areas, i.e. the surface area per weight unit of pigment, of these platelet-shaped substrates, which gives rise to high production costs. Above an average substrate thickness $h_{50}$ of 5000 nm the aspect ratio, i.e. the ratio of diameter to thickness, of the pigments decreases significantly. Accompanying this, the number of pigments per gram of pigment weight also significantly decreases. This is associated with a poorer specific opacity, i.e. covered surface per weight unit of pigment according to the invention, as well as a smaller plane-parallel orientation of the pigments, i.e. orientation of the platelet-shaped pigment surface substantially parallel to the surface of the base to be coated, in an application medium. As a result, a photocatalytic activity would have only a partial action within a closed coating, which expresses itself as a non-uniform and insufficient self-cleaning of the surface.

The average thickness $h_{50}$ of the non-metallic platelet-shaped substrate is determined with reference to scanning electron microscope images of polished cross sections of the pigments according to the invention. The polished cross section of a cured varnish film in which the pigments according to the invention are aligned parallel to the base is examined with a scanning electron microscope, preferably the Supra 35 device from Zeiss, wherein the thickness of the non-metallic platelet-shaped substrate of at least 100 pigments is determined and then statistically averaged.

The non-metallic spherical substrates are preferably selected from the group consisting of $SiO_2$ spheres, glass spheres, hollow glass spheres, such as for example Hollow Glass Microspheres (for example sodium silicate, CAS No. 1344-09-8, sodium borate CAS No. 7775-19-1, amorphous silicon dioxide CAS No. 7631-86-9; from Cospheric) or hollow glass microspheres S32, from 3M, PMMA spheres, PE spheres (PE: polyethylene) and mixtures thereof. Hollow glass spheres are particularly preferred.

The average particle size $D_{50}$ of the non-metallic spherical substrates preferably lies in a range of from 5 to 100 μm, particularly preferably in a range of from 15 to 75 μm and particularly preferably in a range of from 25 to 65 μm.

The average density of the non-metallic spherical substrates lies in a range of from 0.08 to 1.0 g/cm$^3$, preferably in a range of from 0.1 to 0.75 g/cm$^3$. The density is determined using a gas pycnometer, such as for example using a 5200et Pentapycnometer from Quantachrome.

The average particle size $D_{50}$ of the platelet-shaped pigments according to the invention preferably lies in a range of from 2 to 65 μm, further preferably in a range of from 3 to 50 μm, particularly preferably in a range of from 4 to 45 μm and quite particularly preferably in a range of from 5 to 39 μm.

The average particle size $D_{50}$ of the spherical pigments according to the invention preferably lies in a range of from 5 to 100 μm, further preferably in a range of from 15 to 75 μm, and particularly preferably in a range of from 19 to 45 μm.

The average particle size $D_{50}$ of the non-metallic platelet-shaped substrates, of the non-metallic spherical substrates and of the pigments according to the invention stands for the cumulative frequency distribution of the volume-averaged size distribution function, as obtained by laser diffraction methods, and indicates that 50% of the substrates or pigments have a diameter which is the same as or smaller than the respectively specified value. It is determined with a device from Malvern (device: MALVERN Mastersizer 2000) according to the manufacturer's instructions. The scattered light signals are evaluated according to the Fraunhofer method.

The average particle size $D_{50}$ of the uncoated substrates and that of the coated substrates differ only insignificantly. The coating therefore does not substantially contribute to the average particle size.

According to a preferred development of the invention, the barrier layer has or consists of metal oxide, metal hydroxide and/or metal oxide hydrate, wherein the metal is selected from the group which consists of cerium, zinc and mixtures thereof.

To produce the pigments according to the invention, the non-metallic substrate is therefore preferably coated with a barrier layer made of or with metal oxide(s), hydroxide(s) and/or metal oxide hydrate(s) of cerium and/or zinc.

In a preferred embodiment this barrier layer comprises or consists of metal oxide(s), hydroxide(s) and/or metal oxide hydrate(s) of cerium.

In a further embodiment the barrier layer comprises or consists of metal oxide(s), hydroxide(s) and/or metal oxide hydrate(s) of zinc, or of metal oxide(s), hydroxide(s) and/or metal oxide hydrate(s) of cerium and zinc. In the latter case the metal oxides, hydroxides and/or metal oxide hydrates of or made of cerium and zinc can be present as a mixed layer or as two layers separated from each other within the barrier layer. If the metal oxide, hydroxide and/or metal oxide hydrate layer of or made of cerium and zinc are present separately from each other, preferably first a layer of metal oxide, hydroxide and/or metal oxide hydrate of zinc and then a layer of metal oxide, hydroxide and/or metal oxide hydrate of cerium is applied to the substrate to be coated.

According to a preferred development of the invention the barrier layer has a proportion by weight from a range of from 0.1 to less than 5 wt.-%, relative to the total weight of the pigments.

The total level of metal oxide(s), hydroxide(s) and/or metal oxide hydrate(s) of or made of cerium and/or zinc preferably lies in a range of from 0.1 to less than 5 wt.-%, further preferably at <3 wt.-%, still further preferably in a range of from 0.1 to 2.5 wt.-%, particularly preferably in a range of from 0.2 to 2.0 wt.-% and quite particularly preferably in a range of from 0.3 to 1.5 wt.-%, in each case relative to the total weight of the pigment according to the invention.

According to a further preferred embodiment of the invention at least one further inorganic layer is arranged between the at least one barrier layer and the at least one photocatalytically active layer. This at least one further inorganic layer is preferably photocatalytically inactive. It is preferred that the at least one further inorganic layer has a proportion by weight from a range of from 0.1 to less than 10 wt.-%, preferably from a range of from 0.1 to 8.0 wt.-%, particularly preferably from a range of from 0.2 to 5.0 wt.-% and quite particularly preferably from a range of from 0.3 to 3.0 wt.-%, in each case relative to the total weight of the pigments.

In a further embodiment of the invention a second layer of, preferably photocatalytically inactive, metal oxide(s), hydroxide(s) and/or metal oxide hydrate(s), preferably with or made of silicon, zirconium, tin and/or aluminum, is preferably applied to the barrier layer, preferably with or made of metal oxide(s), hydroxide(s) and/or metal oxide hydrate(s) of cerium and/or zinc. The total level of metal oxide(s), hydroxide(s) and/or metal oxide hydrate(s) in this second layer preferably lies at <10 wt.-%, preferably in a range of from 0.1 to 8.0 wt.-%, particularly preferably in a range of from 0.2 to 5.0 wt.-% and quite particularly preferably in a range of from 0.3 to 3.0 wt.-%, in each case relative to the total weight of the pigment according to the invention.

In a preferred embodiment the second layer comprises or consists of metal oxide(s), hydroxide(s) and/or metal oxide hydrate(s) of silicon and/or tin, quite particularly preferably of metal oxide(s), hydroxide(s) and/or metal oxide hydrate(s) of silicon.

According to a further preferred embodiment of the invention the at least one photocatalytically active layer, which is preferably a photocatalytically active metal oxide, metal hydroxide and/or metal oxide hydrate layer, is the outermost inorganic layer. The outermost inorganic layer is therefore the exterior inorganic layer of the pigments according to the invention.

This exterior photocatalytically active inorganic layer, preferably titanium oxide, titanium hydroxide and/or titanium oxide hydrate layer, can be organic-chemically surface-modified. Via the organic-chemical surface modification, for example a chemical bonding, for example forming covalent bonds, to a binder matrix surrounding the pigments can be possible. The leafing behavior of the pigments, in particular the platelet-shaped pigments, according to the invention can also be influenced and adjusted by the organic-chemical surface modification.

The proportion of the photocatalytically active layer preferably lies in a range of from 2 to less than 30 wt.-%, preferably in a range of from 3 to 28 wt.-%, particularly preferably in a range of from 4 to 26 wt.-% and quite particularly preferably in a range of from 5 to 23 wt.-%, in each case relative to the total weight of the pigment according to the invention.

According to a further preferred embodiment of the invention the photocatalytically active layer is selected from the group which consists of titanium oxide, titanium hydroxide, titanium oxide hydrate and mixtures thereof.

A third layer made of metal oxide(s), hydroxide(s) and/or metal oxide hydrate(s) made of or with titanium is preferably applied to the second layer, preferably with or made of metal oxide(s), hydroxide(s) and/or metal oxide hydrate(s) of silicon, zirconium, tin and/or aluminum.

The level of metal oxide(s), hydroxide(s) and/or metal oxide hydrate(s) of titanium preferably lies in a range of from 2 to <30 wt.-%, preferably in a range of from 3 to 28 wt.-%, particularly preferably in a range of from 4 to 26 wt.-% and quite particularly preferably in a range of from 5 to 23 wt.-%, in each case relative to the total weight of the pigment according to the invention.

The level or proportion of the photocatalytically active layer, preferably of photocatalytically active metal oxide(s), hydroxide(s) and/or metal oxide hydrate(s), in particular of titanium, is chosen according to the invention to be so low that the pigments according to the invention both are achromatic and yet do not have a silver interference color.

A measure for the achromaticity is the chroma value.

The chroma of the pigments according to the invention preferably lies at C*≤15, preferably in a range of C*=0 to 13 and particularly preferably in a range of C*=0.1 to 11.

The chroma values are measured with a CM700d spectrophotometer from Konika Minolta, under standard illuminant D65 in SCE mode with reference to varnish applications on black-white opacity charts (Byko Chart 2853, from Byk-Gardner). For this, 6 wt.-% of the respective pigment, relative to the total weight of the varnish, is stirred into a conventional nitrocellulose varnish (Dr. Renger Erco bronzing mixed varnish 2615e; from Morton). The pigment is provided and then dispersed in the varnish with a brush. The completed varnish is applied with a wet-film thickness of 100 μm to the black-white opacity charts using a doctor-blade drawdown device. The varnish applications are measured to establish the color values on the black base of the opacity charts, wherein the color values are represented by the difference between the measured values of the varnished opacity chart and the unvarnished opacity chart.

The level of photocatalytically active metal oxide(s), hydroxide(s) and/or metal oxide hydrate(s), preferably of titanium, is dependent on the specific surface area of the pigment according to the invention. The larger the specific surface area of the pigment to be coated, the higher the required amount of educt for coating with photocatalytically active metal oxide(s), hydroxide(s) and/or metal oxide hydrate(s), preferably of titanium.

Depending on the specific surface area of the pigment based on a platelet-shaped substrate, the level of photocatalytically active metal oxide(s), hydroxide(s) and/or metal oxide hydrate(s), preferably of titanium (titanium content), i.e. titanium content/specific surface area [wt.-%·g/m$^2$], preferably lies at <1.0, particularly preferably in a range of from 0.1 to 0.9 and quite particularly preferably in a range of from 0.2 to 0.7.

Depending on the specific surface area of the pigment based on a spherical substrate, the level of photocatalytically active metal oxide(s), hydroxide(s) and/or metal oxide hydrate(s), preferably of titanium (titanium content), i.e. titanium content/specific surface area [wt.-%·g/m$^2$], preferably lies at <3.0, particularly preferably in a range of from 0.1 to 2.5 and quite particularly preferably in a range of from 0.2 to 2.2.

The average layer thickness of the photocatalytically active layer, preferably of the titanium oxide, hydroxide and/or titanium oxide hydrate layer, irrespective of whether the non-metallic substrate is present platelet-shaped or spherical, preferably lies at 40 nm, particularly preferably in a range of from 5 to 36 nm, further preferably in a range of from 7 to 32 nm and quite particularly preferably in a range of from 10 to 30 nm. The average layer thickness of the photocatalytically active layer, preferably of the photocatalytically active metal oxides, hydroxides and/or oxide hydrates, in particular of the titanium oxide, titanium hydroxide and/or titanium oxide hydrate layer, is ascertained with reference to scanning electron microscope images of polished cross sections of the pigments according to the invention. For this, a polished cross section of a cured resin in which the pigments are aligned parallel to the base is examined under the scanning electron microscope and the layer thickness of the photocatalytically active layer, in particular of the titanium oxide, hydroxide and/or titanium oxide hydrate layer, of at least 100 pigments is measured. To obtain the average layer thickness, the average value is generated from these measured values.

The pigment according to the invention particularly preferably has a photocatalytically active coating made of or with, preferably made of, titanium oxide, titanium hydroxide and/or titanium oxide hydrate.

In a particularly preferred embodiment the pigment according to the invention is not calcined after completed coating and optionally completed surface modification, but rather dried only at a temperature of ≤200° C. Because of the drying in this temperature range, any titanium dioxide present does not crystallize either in the anatase modification or in the rutile modification, but rather is preferably present in amorphous form. X-ray diffractometric analyses have almost no reflexes typical for correspondingly crystalline layers at e.g. 36° and 54° for rutile or at 38° for anatase. Amorphous substances are characterized by the lack of an order (e.g. crystal lattice). Usually, typically amorphous substances such as e.g. glass, have a "short-range order" which is characterized by the occurrence of an "amorphous hump". The height of the hump is dependent on the proportion of the amorphous substance.

If crystalline substances such as for example mica are used as substrate, any general humps disappear in the background noise in most cases.

Through the drying, a very large specific surface area is generated which is responsible, among other things, for the stronger photocatalytic action compared with similar calcined layers. The specific surface area of the pigments according to the invention is in general quite high and lies at >15 $m^2/g$, furthermore preferably at >20 $m^2/g$ and particularly preferably at >25 $m^2/g$. Specific surface areas of up to 70 $m^2/g$, further preferably up to 100 $m^2/g$ can be obtained.

To determine the specific surface area according to BET, preferably with the BELsorp mini II device from BEL, the pigments are heated for 2 h at 300° C. and then the specific surface area carried out under liquid nitrogen.

The specific surface area is, among other things, dependent on the average particle size $D_{50}$ of the pigments according to the invention. In principle, the smaller the average particle size $D_{50}$, the larger the specific surface area.

Furthermore, the specific surface area is dependent on the shape of the pigments according to the invention, i.e. pigments based on spherical substrates sometimes have smaller surface area values than platelet-shaped pigments with the same average particle size $D_{50}$.

In a comparison of pigments according to the invention which have been dried at a temperature of <200° C. with calcined pigments which have been heated to a temperature of usually from 600 to 900° C., the quotient of the specific surface area and the average particle size $D_{50}$ defined as specific particle surface area [m/g] is much higher and lies at >1.0-$10^6$ m/g.

A further effect of the drying is that the loss on ignition of the pigments according to the invention is higher than in the case of conventional pearlescent pigments. The loss on ignition preferably lies at >1.0 wt.-%, particularly preferably in a range of from 1.5 to 10 wt.-%, further preferably in a range of from 1.8 to 8.0 wt.-% and quite particularly preferably in a range of from 2.0 to 6.0 wt.-%, in each case relative to the total weight of the pigment.

The loss on ignition is determined using a muffle furnace at 850° C. For this, the pigment is weighed out into an already pre-ignited annealing crucible and heated for 1 h at 850° C. Then, after cooling in a desiccator, the weight loss is ascertained as a percentage.

The photocatalysis in the case of anatase preferably occurs in a wavelength range of approx. 390 nm, thus is only effective in ultraviolet light. As the UV range only makes up a small portion of sunlight, it is possible, by doping, to reduce the band gaps of e.g. anatase and thus to utilize a larger range from the spectrum of sunlight for photocatalytic applications. Depending on the doping agent, irrespective of whether by its nature it is anionic or cationic or of the interstitial type, differences in the size of the band gaps can be observed. The formation of intermediate energy levels between the valence band and the conduction band opens up the possibility of using not only ultraviolet radiation, but also visible light to excite a valence band electron.

In specific embodiments, for example, the titanium oxide, titanium hydroxide and/or titanium oxide hydrate layer can be doped with carbon, nitrogen, cerium, aluminum, tin and/or transition metals such as e.g. iron, zinc. The respective doping agent is preferably used in a quantity of <1 wt.-%, particularly preferably in a quantity of <0.5 wt.-% and quite particularly preferably in a quantity of <0.3 wt.-%, in each case relative to the total weight of the titanium oxide, titanium hydroxide and/or titanium oxide hydrate layer.

The selectively light-absorbing barrier layer can absorb light in a wavelength range of from 0.10 to 10 μm, preferably in a wavelength range of from 0.18 to 2.5 μm, further preferably in a wavelength range of from 0.20 to 1.0 μm, particularly preferably in a wavelength range of from 0.30 to 0.80 μm and quite particularly preferably in a wavelength range of from 0.18 to 0.40 μm.

An advantage of the pigments according to the invention is that they only insignificantly appear in a surrounding varnish film. This is of interest for example for coats of varnish which, although they are intended to protect the base, are not intended to alter the appearance of the base optically, e.g. protective wood varnishes which are not intended to hide the grain of the wood. The opacity quotient Dq as a measured value, independent of the base, for the opacity of the pigments according to the invention can be used as a measure for the coverage. The opacity quotient Dq, defined as $$Dq = \frac{L^*_{110,black}}{L^*_{110,white}}$$

is determined with reference to varnish applications on black-white opacity charts. For this, the pigment is stirred into a conventional nitrocellulose varnish (Dr. Renger Erco bronzing mixed varnish 2615e; from Morton) at a level of pigmentation of 6 wt.-%, relative to the total weight of the wet varnish. The completed varnish is applied with a wet-film thickness of 100 μm to the black-white opacity charts using a doctor-blade drawdown device. The lightness values L* are measured with a measurement geometry of 110°, relative to the angle of emergence of the light irradiated at 45°, with reference to these varnish applications on the black background and on the white background of the black-white opacity chart, using the BYK-mac device, from Byk-Gardner.

The closer the value of the opacity quotient Dq approaches to 0, the more transparent the corresponding pigment appears to an observer, at an identical level of pigmentation in wt.-%. The pigments according to the invention, based on platelet-shaped substrates, preferably have an opacity quotient Dq<0.5. The pigments according to the invention, based on spherical substrates, preferably have an opacity quotient Dq<0.75.

In addition to the low opacity quotient, the pigments according to the invention are characterized, in contrast to interference pigments customary in the trade, by their low reflection property. As a measure for the specular reflection, the gloss can be measured with reference to the varnish applications from IIf "Opacity quotient" on black-white opacity charts (Byko Chart 2853, from Byk-Gardner) with the aid of a Micro-Tri-Gloss glossmeter, from Byk-Gardner, on black base at a measurement angle of 20° relative to the vertical. The pigments according to the invention, based on platelet-shaped substrates, preferably have gloss values of <5, further preferably of <4.5 and particularly preferably of <4.2. Pigments according to the invention, based on spherical substrates, preferably have gloss values of <3.0 and particularly preferably of <2.0.

Photocatalytically active titanium dioxide particles are state of the art and are used in many applications, such as for example in paving stones or in silicate wall paints. Their use is limited above all to inorganic matrices, as the photocatalytic action acts in all directions and for example organic binders, just like any contaminations, in the immediate vicinity of the titanium dioxide particles are radically attacked.

The targeted incorporation of a barrier layer in the pigment prevents radicals from being generated or further transported everywhere around a pigment in the binder matrix and thus bringing about the usual complete decomposition. In order that this barrier layer does not suppress or limit the photocatalytic activity of the pigment, it is necessary to arrange the barrier layer between non-metallic substrate and photocatalytically active layer, preferably a titanium oxide, titanium hydroxide and/or titanium oxide hydrate layer, for example a $TiO_2$ layer.

With this special pigment structure according to the invention, it is possible for the pigments embedded close to the surface in the binder matrix to generate radicals by photocatalysis and to decompose organic pollutant components in their surroundings in a desired manner.

However, radicals are formed only on the pigment areas facing the light, there is no radical formation on the areas shadowed by the pigment, as the applied barrier layer is doubly effective here. For one thing, the barrier layer can accept electrons that form (electron acceptor) and prevent a radical formation and, for another thing, the barrier layer can filter the excitation light, for example UV light, and thus reduce the amount of excitation light, for example UV light, passing through onto the underside of the pigment.

It is thereby guaranteed that the pigment according to the invention with photocatalytic activity remains anchored fast in the organic binder matrix, and thus the photocatalytic activity is preserved or is available for much longer in the coating.

Like the weather-stabilized pearlescent pigments known from the state of the art, the pigments according to the invention likewise have a barrier layer, for example made of or with cerium oxide/hydroxide. However, in the pigments according to the invention, the barrier layer is inverted, thus applied facing the substrate. In the state of the art, the barrier layer is arranged as the exterior, therefore not as the interior, layer. This layer sequence makes a high photoactivity possible on the surface facing the light, but prevents photoactivity from occurring on the pigment underside.

This effect can be represented very well with the aid of the test for determining the binder decomposition and the photocatalytic activity (IIj). Here the pigments according to the invention display a high cleaning action, but without strongly affecting the surrounding binder.

To produce the pigments according to the invention, the non-metallic platelet-shaped or spherical substrate is suspended in a liquid medium, preferably in water. The suspension is preferably kept at a temperature from a range of from 50° C. to 100° C. and preferably at a constant pH from a range of from 3.5 to 10.0. For precipitation of the barrier layer, a water-soluble inorganic metal compound, preferably an inorganic cerium or zinc compound, is preferably added. For precipitation of any further inorganic layer, which is preferably photocatalytically inactive, an inorganic cover layer is applied for example in aqueous solution, with dosing of an alkaline water glass and/or a tin, aluminum or zirconium salt solution at constant pH. Then, for precipitation of the exterior photocatalytically active layer, a water-soluble inorganic titanium compound is preferably added. After completed addition of the water-soluble titanium compound, the suspension now obtained is preferably subsequently stirred for at least 30 minutes, filtered and the filter cake is then dried at <200° C.

Alternatively, the pigments according to the invention can also be produced in alcoholic medium. For this, the non-metallic, preferably platelet-shaped or spherical, substrate is suspended in an alcoholic liquid phase and a corresponding barrier layer is formed by addition preferably of a cerium- or zinc-containing solution at constant pH.

For precipitation of any further inorganic layer which is preferably photocatalytically inactive, for example an alkaline water glass and/or a tin, aluminum or zirconium salt solution is metered into the corresponding medium at constant pH.

The precipitation of the subsequent photocatalytically active layer, preferably a highly refractive titanium layer, takes place accompanied by simultaneous metered addition of a titanium alcoholate and water. Optionally, a surface modification can take place by addition of at least one silane with a functional binding group and/or at least one silane without functional binding group.

The pigments according to the invention can optionally be provided with an organic-chemical surface modification which makes it easier to incorporate the pigments into different varnish systems, can alter the hydrophilic or hydrophobic properties of the pigment surface or can influence their orientation in a varnish system. In a preferred embodiment, the pigments according to the invention orient themselves on the surface of a varnish film, i.e. pigments with leafing behavior are produced by the optionally present surface modification.

In a particularly preferred embodiment, the pigments according to the invention orient themselves closely underneath the surface of a varnish film, with the result that the pigments are incorporated well in the varnish matrix surrounding them, but the varnish layer very slightly precipitates above the pigment according to the invention. The pigment can thus decompose these in a targeted manner by photocatalysis and then contribute to the photocatalytic surface cleaning.

The pigments according to the invention are preferably leafing pigments which arrange themselves on the surface or close to the surface of a binder system, for example a varnish or a paint.

The optionally present surface modification can comprise or consist of one or more silanes. The silanes can be alkyl silanes having branched or unbranched alkyl radicals with 1 to 24 C atoms.

In a preferred embodiment, for the surface modification of the pigments according to the invention, preferably organofunctional silanes are used which make a chemical bonding to e.g. a surrounding binder matrix of a varnish system possible and thus can influence the incorporation of the pigments according to the invention or their orientation in a varnish system.

As organofunctional silanes, for example 3-methacryloxypropyltrimethoxysilane (Dynasylan MEMO, from Evonik; Silquest A-174NT, from Momentive), vinyltri(m)ethoxysilane (Dynasylan VTMO or VTEO; Silquest A-151 or A-171), methyltri(m)ethoxysilane (Dynasylan MTMS or MTES), 3-mercaptopropyltrimethoxysilane (Dynasylan MTMO; Silquest A-189), 3-glycidoxypropyltrimethoxysilane (Dynasylan GLYMO; Silquest A-187), tris[3-(trimethoxysilyl)propyl]isocyanurate (Silquest Y-11597), bis[3-(triethoxysilyl)propyl]tetrasulfide (Silquest A-1289), bis[3-(triethoxysilyl)propyl]disulfide (Silquest A-1589), beta-(3,4-epoxycyclohexyl)ethyltrimethoxysilane (Silquest A-186), bis(triethoxysilyl)ethane (Silquest Y-9805), gamma-isocyanatopropyltrimethoxysilane (Silquest A-Link 35; Geniosil GF40, from Wacker), methacryloxymethyltri(m)ethoxysilane (Geniosil XL 33, Geniosil XL 36), (methacryloxymethyl)methyldimethoxysilane (Geniosil XL 32, Geniosil XL 34), (methacryloxymethyl)methyldiethoxysilane, (isocyanatomethyl)methyldimethoxysilane, (isocyanatomethyl)trimethoxysilane, 3-(triethoxysilyl)propylsuccinic anhydride, 2-acryloxyethylmethyldimethoxysilane, 2-methacryloxyethyltrimethoxysilane, 3-acryloxypropylmethyldimethoxysilane, 2-acryloxyethyltrimethoxysilane, 2-methacryloxyethyltriethoxysilane, 3-acryloxypropyltrimethoxysilane, 3-acryloxypropyltripropoxysilane, 3-methacryloxypropyltriethoxysilane, 3-methacryloxypropyltriacetoxysilane, 3-methacryloxypropylmethyldimethoxysilane, vinyltrichlorosilane, vinyltri(m)ethoxysilane (Geniosil XL 10, Geniosil GF 56), vinyltris(2-methoxyethoxy)silane, vinyltriacetoxysilane or mixtures thereof can be used.

Preferably, 3-methacryloxypropyltrimethoxysilane (Dynasylan MEMO; Silquest A-174NT), vinyltri(m)ethoxysilane (Dynasylan VTMO or VTEO; Silquest A-151 or A-171), methyltri(m)ethoxysilane (Dynasylan MTMS or MTES), beta-(3,4-epoxycyclohexyl)ethyltrimethoxysilane (Silquest A-186), bis(triethoxysilyl)ethane (Silquest Y-9805), gamma-isocyanatopropyltrimethoxysilane (Silquest A-Link 35; Geniosil GF40), methacryloxymethyltri(m)ethoxysilane (Geniosil XL 33, Geniosil XL 36), (methacryloxymethyl)(m)ethyldimethoxysilane (Geniosil XL 32, Geniosil XL 34), 3-(triethoxysilyl)propylsuccinic anhydride, vinyltrimethoxysilane (Geniosil XL 10), vinyltris(2-methoxyethoxy)silane or mixtures thereof are used as organofunctional silanes.

Furthermore, aqueous pre-hydrolysates can be used. These include, among other things, aqueous aminosiloxanes (Dynasylan Hydrosil 1151, from Evonik), aqueous amino/alkyl functional siloxane (Dynasylan Hydrosil 2627 or 2909), aqueous diamino functional siloxane (Dynasylan Hydrosil 2776), aqueous, aqueous epoxy functional siloxane (Dynasylan Hydrosil 2926), amino/alkyl functional oligosiloxane (Dynasylan 1146), vinyl/alkyl functional oligosiloxane (Dynasylan 6598), oligomeric vinylsilane (Dynasylan 6490) or oligomeric short-chain alkyl functional silane (Dynasylan 9896).

In a further embodiment, for the surface modification of the pigments according to the invention, mixtures with or of organofunctional silanes and aqueous pre-hydrolysates can be used.

In a further embodiment, the surface modification of the pigments according to the invention comprises or consists of at least one alkyl silane and at least one amino functional silane. The alkyl silane is preferably an alkyl silane of the formula $R_{(4-z)}Si(X)_z$, wherein z is an integer from 1 to 3, R is a substituted or unsubstituted, unbranched or branched alkyl chain with 10 to 22 C atoms, and X stands for a halogen and/or alkoxy group. Alkyl silanes with at least 12 C atoms in the alkyl chain are quite particularly preferred.

As amino functional silanes, 3-aminopropyltrimethoxysilane (Dynasylan AMMO, from Evonik; Silquest A-1110, from Momentive), 3-aminopropyltriethoxysilane (Dynasylan AMEO), [3-(2-aminoethyl)aminopropyl]trimethoxysilane (Dynasylan DAMO, Silquest A-1120), [3-(2-aminoethyl)aminopropyl]triethoxysilane, triamino functional trimethoxysilane (Silquest A-1130), bis-(gamma-trimethoxysilylpropyl)amine (Silquest A-1170), N-ethyl-gamma-aminoisobutyltrimethoxysilane (Silquest A-Link 15), N-phenyl-gamma-aminopropyltrimethoxysilane (Silquest Y-9669), 4-amino-3,3-dimethylbutyltrimethoxysilane (Silquest A-1637), N-cyclohexylaminomethylmethyldiethoxysilane (Geniosil XL 924), N-cyclohexylaminomethyltriethoxysilane (Geniosil XL 926), N-phenylaminomethyltrimethoxysilane (Geniosil XL 973) or mixtures thereof can be used.

In a particularly preferred embodiment, the present invention comprises a pigment based on a non-metallic platelet-shaped substrate, preferably natural or synthetic mica platelets or glass platelets, and a coating applied thereto, wherein the coating, starting from the substrate, consists of the following layers:

a) metal oxides, hydroxides and/or metal oxide hydrates of cerium in a level from a range of from 0.1 to 1.4 wt.-%, relative to the total weight of the pigment,
b) metal oxides, hydroxides and/or metal oxide hydrates of silicon in a level from a range of from 0.4 to 2.2 wt.-%, relative to the total weight of the pigment,
c) metal oxides, hydroxides and/or metal oxide hydrates of titanium in a level from a range of from 5.2 to 24.0 wt.-%, relative to the total weight of the pigment, and
d) optionally an organic-chemical surface modification.

In a further preferred embodiment, the present invention comprises a pigment based on a non-metallic platelet-shaped substrate, preferably natural or synthetic mica platelets or glass platelets, and a coating applied thereto, wherein the coating, starting from the substrate, consists of the following layers:

a) metal oxides, hydroxides and/or metal oxide hydrates of cerium in a level from a range of from 0.1 to 1.4 wt.-%, relative to the total weight of the pigment,
b) metal oxides, hydroxides and/or metal oxide hydrates of silicon in a level from a range of from 0.4 to 2.2 wt.-%, relative to the total weight of the pigment,
c) metal oxides, hydroxides and/or metal oxide hydrates of titanium in a level from a range of from 5.2 to 24.0 wt.-%, relative to the total weight of the pigment, and
d) optionally an organic-chemical surface modification, wherein the pigment preferably has a specific surface area according to BET from a range of from 17 to 50 $m^2/g$.

In a preferred embodiment, the present invention comprises a pigment based on a non-metallic platelet-shaped substrate, preferably natural or synthetic mica platelets or glass platelets, and a coating applied thereto, wherein the coating, starting from the substrate, consists of the following layers:

a) metal oxides, hydroxides and/or metal oxide hydrates of zinc in a level from a range of from 0.3 to 2.9 wt.-%, relative to the total weight of the pigment,
b) metal oxides, hydroxides and/or metal oxide hydrates of silicon in a level from a range of from 0.4 to 2.5 wt.-%, relative to the total weight of the pigment,
c) metal oxides, hydroxides and/or metal oxide hydrates of titanium in a level from a range of from 4.9 to 22.5 wt.-%, relative to the total weight of the pigment, and
d) optionally an organic-chemical surface modification.

In a further embodiment, the present invention comprises a pigment based on a non-metallic platelet-shaped substrate, preferably natural or synthetic mica platelets or glass platelets, and a coating applied thereto, wherein the coating, starting from the substrate, consists of the following layers:

a) metal oxides, hydroxides and/or metal oxide hydrates of cerium in a level from a range of from 0.3 to 2.8 wt.-%, relative to the total weight of the pigment, b) metal oxides, hydroxides and/or metal oxide hydrates of tin in a level from a range of from 0.3 to 2.8 wt.-%, relative to the total weight of the pigment,
c) metal oxides, hydroxides and/or metal oxide hydrates of titanium in a level from a range of from 5.6 to 23.6 wt.-%, relative to the total weight of the pigment, and
d) optionally an organic-chemical surface modification.

In a further embodiment, the present invention comprises a pigment based on a non-metallic platelet-shaped substrate, preferably natural or synthetic mica platelets or glass platelets, and a coating applied thereto, wherein the coating, starting from the substrate, consists of the following layers:
a) metal oxides, hydroxides and/or metal oxide hydrates of cerium in a level from a range of from 0.2 to 1.3 wt.-%, relative to the total weight of the pigment,
b) metal oxides, hydroxides and/or metal oxide hydrates of titanium in a level from a range of from 6.5 to 24.6 wt.-%, relative to the total weight of the pigment, and
c) optionally an organic-chemical surface modification.

In a further embodiment, the present invention comprises a pigment based on a non-metallic platelet-shaped substrate, preferably natural or synthetic mica platelets or glass platelets, and a first layer with or made of metal oxides, hydroxides and/or metal oxide hydrates of cerium, a second layer with or made of metal oxides, hydroxides and/or metal oxide hydrates of silicon, a third layer with or made of metal oxides, hydroxides and/or metal oxide hydrates of titanium, optionally a surface modification, wherein the pigment was dried at a temperature from a range of from 80 to 160° C. after completed coating and optionally completed organic-chemical surface modification.

In a further embodiment, the present invention comprises a pigment based on a non-metallic spherical substrate, preferably hollow glass spheres, and a coating applied thereto, wherein the coating, starting from the substrate, consists of the following layers:
a) metal oxides, hydroxides and/or metal oxide hydrates of cerium in a level from a range of from 0.2 to 0.9 wt.-%, relative to the total weight of the pigment,
b) metal oxides, hydroxides and/or metal oxide hydrates of silicon in a level from a range of from 0.4 to 2.8 wt.-%, relative to the total weight of the pigment,
c) metal oxides, hydroxides and/or metal oxide hydrates of titanium in a level from a range of from 3.0 to 11.0 wt.-%, relative to the total weight of the pigment, and
d) optionally an organic-chemical surface modification.

EXAMPLES

The following examples are intended to explain the invention in more detail, but without limiting it. All percentages are to be understood as wt.-%.

I Production of the Pigments According to the Invention

Example 1

270 g synthetic mica platelets (FM1040, from Jhejan, China) with the particle-size distribution $D_{10}$=11.4 μm, $D_{50}$=21.8 μm, $D_{90}$=40.0 μm (Mastersizer MS 2000, from Malvern) were suspended in 1350 ml demineralized water and heated to 80° C. accompanied by stirring. The pH was adjusted with diluted hydrochloric acid or diluted alkaline lye (depending on the starting pH) to 7.5. By addition of 150 ml of a 1.4 wt.-% cerium nitrate solution accompanied by simultaneous metered addition of an alkaline lye, a corresponding layer was formed. A water glass solution (5.6 g water glass solution, 27 wt.-% $SiO_2$, mixed with 20 g demineralized water) was then introduced slowly into the suspension and the pH was kept constant at pH 7.5. The suspension was subsequently stirred for 2 h and then the pH was adjusted to pH 2.0. A solution of 150 ml $TiCl_4$ (200 g $TiO_2$/l demineralized water) and a 10 wt.-% aqueous caustic soda solution were then metered into the suspension. After the coating had ended, subsequent stirring for 1 h and filtering off were carried out. The obtained pigment was dried for 12 h at 90° C. in a vacuum drying oven.

Example 2

270 g natural mica platelets (muscovite mica platelets) with the particle-size distribution $D_{10}$=11.0 μm, $D_{50}$=23.1 μm, $D_{90}$=44.4 μm (Mastersizer MS 2000, from Malvern) were suspended in 1350 ml demineralized water and heated to 80° C. accompanied by stirring. The pH was adjusted with diluted hydrochloric acid or diluted alkaline lye (depending on the starting pH) to 7.5. By addition of 150 ml of a 1.4 wt.-% cerium nitrate solution accompanied by simultaneous metered addition of an alkaline lye, a corresponding layer was formed. A water glass solution (5.6 g water glass solution, 27% $SiO_2$, mixed with 20 g demineralized water) was then introduced slowly into the suspension and the pH was kept constant at pH 7.5. The suspension was now subsequently stirred for 2 h and then the pH was adjusted to 2.0. A solution of 150 ml $TiCl_4$ (200 g $TiO_2$/l demineralized water) and a 10 wt.-% aqueous caustic soda solution were then metered into the suspension. After the coating had ended, subsequent stirring for 1 h and filtering off were carried out. The obtained pigment was dried for 12 h at 90° C. in a vacuum drying oven.

Example 3

A suspension of 200 g glass platelets (average thickness: 1 μm, standard deviation of the thickness: approx. 40%) in demineralized water (approx. 3 wt.-%) was screened through a 100-μm sieve, the through fraction was sieved through a 75-μm sieve. This latter through fraction was sieved through a 40-μm sieve. The sieving procedure was repeated twice with the sieving residue obtained <40 μm sieve. Glass platelets were obtained which had the following particle-size distribution: $D_{10}$=16.1 μm, $D_{50}$=32.2 μm, $D_{90}$=57.7 μm (Mastersizer MS 2000, from Malvern).

150 g of the screened glass platelets were suspended in 1350 ml demineralized water and heated to 80° C. accompanied by stirring. The pH was adjusted with diluted hydrochloric acid or diluted alkaline lye (depending on the starting pH) to 7.5. By addition of 150 ml of a 1.4 wt.-% cerium nitrate solution accompanied by simultaneous metered addition of an alkaline lye, a corresponding layer was formed. A water glass solution (3.1 g water glass solution, 27% $SiO_2$, mixed with 20 g demineralized water) was then introduced slowly into the suspension and the pH was kept constant at pH 7.5. The suspension was now subsequently stirred for 2 h and then the pH was adjusted to 2.0. A solution of 40 ml $TiCl_4$ (200 g $TiO_2$/l demineralized water) and a 10% aqueous caustic soda solution were then metered into the suspension. After the coating had ended, subsequent stirring for 1 h and filtering off were carried out. The obtained pigment was dried for 12 h at 90° C. in a vacuum drying oven.

Example 4

270 g synthetic mica platelets (FM1040, from Jhejan, China) with the particle-size distribution $D_{10}$=11.4 μm, $D_{50}$=21.8 µm, $D_{90}$=40.0 µm (Mastersizer MS 2000, from Malvern) were suspended in 1350 ml demineralized water and heated to 80° C. accompanied by stirring. The pH was adjusted with diluted hydrochloric acid or diluted alkaline lye (depending on the starting pH) to 10.5. By addition of 50 ml of a 5.2 wt.-% zinc chloride solution accompanied by simultaneous metered addition of an alkaline lye, a corresponding layer was formed. A water glass solution (5.6 g water glass solution, 27% $SiO_2$, mixed with 20 g demineralized water) at pH 7.5 was then introduced slowly into the suspension and the pH was kept constant at pH 7.5. The suspension was now subsequently stirred for 2 h and then the pH was adjusted to 2.0. A solution of 225 ml $TiCl_4$ (200 g $TiO_2$/l demineralized water) and a 10 wt.-% aqueous caustic soda solution were then metered into the suspension. After the coating had ended, subsequent stirring for 1 h and filtering off were carried out. The obtained pigment was dried for 12 h at 90° C. in a vacuum drying oven.

Example 5

270 g synthetic mica platelets (FM0525, from Jhejan, China) with the particle-size distribution $D_{10}$=5.2 µm, $D_{50}$=11.2 µm, $D_{90}$=23.9 µm (Mastersizer MS 2000, from Malvern) were suspended in 1500 ml demineralized water and heated to 80° C. accompanied by stirring. By addition of 150 ml of a 1.4 wt.-% cerium nitrate solution accompanied by simultaneous metered addition of an alkaline lye, a corresponding layer was formed. The pH of the suspension was adjusted with diluted HCl to pH 2.2 and then, by addition of a tin chloride solution, a 10 nm thick $SnO_2$ layer was precipitated onto the substrate. The suspension was now subsequently stirred for 2 h and then a solution of 150 ml $TiCl_4$ (200 g $TiO_2$/l demineralized water) and a 10 wt.-% aqueous caustic soda solution were metered into the suspension. After the coating had ended, subsequent stirring for 1 h and filtering off were carried out. The obtained pigment was dried for 12 h at 90° C. in a vacuum drying oven.

Example 6

270 g synthetic mica platelets (FM0015, from Jhejan, China) with the particle-size distribution $D_{10}$=2.0 µm, $D_{50}$=6.1 µm, $D_{90}$=12.9 µm (Mastersizer MS 2000, from Malvern) were suspended in 1600 ml demineralized water and heated to 80° C. accompanied by stirring. The pH was adjusted with diluted hydrochloric acid or diluted alkaline lye (depending on the starting pH) to 7.5. By addition of 150 ml of a 1.4 wt.-% cerium nitrate solution accompanied by simultaneous metered addition of an alkaline lye, a corresponding layer was formed. A water glass solution (5.6 g water glass solution, 27% $SiO_2$, mixed with 20 g demineralized water) was then introduced slowly into the suspension and the pH was kept constant at pH 7.5. The suspension was now subsequently stirred for 2 h and then the pH was adjusted to 2.0. A solution of 150 ml $TiCl_4$ (200 g $TiO_2$/l demineralized water) and a 10 wt.-% aqueous caustic soda solution were then metered into the suspension. After the coating had ended, subsequent stirring for 1 h and filtering off were carried out. The obtained pigment was dried for 12 h at 90° C. in a vacuum drying oven.

Example 7

150 g hollow glass microspheres (S32, from 3M) with a particle size of $D_{10}$=20.0 µm, $D_{50}$=40 µm, $D_{90}$=75 µm (according to the manufacturer's instructions) were suspended in 1150 ml demineralized water and heated to 80° C. accompanied by stirring. The pH was adjusted with diluted hydrochloric acid or diluted alkaline lye (depending on the starting pH) to 7.5. By addition of 150 ml of a 1.4 wt.-% cerium nitrate solution accompanied by simultaneous metered addition of an alkaline lye, a corresponding layer was formed. A water glass solution (0.9 g water glass solution, 27% $SiO_2$, mixed with 20 g demineralized water) was then introduced slowly into the suspension and the pH was kept constant at pH 7.5. The suspension was now subsequently stirred for 2 hours and then the pH was adjusted to 2.0. A solution of 30 ml $TiCl_4$ (200 g $TiO_2$/l demineralized water) and a 10 wt.-% aqueous caustic soda solution were then metered into the suspension. After the coating had ended, subsequent stirring for 1 h and filtering off were carried out. The obtained pigment was dried for 12 h at 90° C. in a vacuum drying oven.

Example 8

150 g synthetic mica platelets (FM1040, from Jhejan, China) with the particle-size distribution $D_{10}$=11.4 µm, $D_{50}$=21.8 µm, $D_{90}$=40.0 µm (Mastersizer MS 2000, from Malvern) were suspended in a mixture of 800 ml isopropanol and 100 ml demineralized water and heated to 70° C. accompanied by stirring. Once the temperature had been reached, the addition of 9.4 g of a 1.4 wt.-% isopropanolic cerium nitrate solution was started. The suspension was now subsequently stirred for 2 h and then the pH was adjusted with the aid of a 25 wt.-% ammonia solution to pH 5.0. A solution of 60 g titanium(IV) isopropylate, dissolved in 60 ml isopropanol, was then metered in. Subsequent stirring for 1 h and filtering off then followed. The obtained pigment was dried for 12 h at 90° C. in a vacuum drying oven and screened through a sieve with a sieve mesh size of 45 µm.

Comparison Example 1

100 g commercially available silver pearlescent pigment based on $TiO_2$-coated mica with the fineness 10-50 µm (PHOENIX PX 1001, from Eckart) was suspended in 300 ml isopropanol and brought to boiling point. Accompanied by stirring, first 2.0 g $H_2O$ and then, within one hour, a solution of 2.17 g $Ce(NO_3)_3$ in 100 g isopropanol were added. A solution of 0.45 g ethylene diamine in 3.0 g $H_2O$ was then added. Over a period of 2 h, 10.6 g tetraethoxysilane and 22 g isopropanol were then introduced continuously with a dosing pump (Ismatec). The suspension was then allowed to continue reacting for another 6 h. 0.4 g Dynasylan AMEO and 1.3 g Dynasylan 9116 were then added and the mixture was allowed to cool slowly. The mixture was stirred at room temperature overnight and filtered off the next day. The pigment was then dried under vacuum at 80° C. The pigment had a theoretical Ce content of 0.7 wt.-% and a $SiO_2$ content of 3.0 wt.-%.

Comparison Example 2

Test analogous to Example 4, but a solution of 550 ml $TiCl_4$ (200 g $TiO_2$/l demineralized water) and a 10 wt.-% aqueous caustic soda solution were metered into the suspension. The level of titanium oxide, hydroxide and/or titanium oxide hydrate, determined via XRF analysis as titanium dioxide, was thus 30 wt.-%, relative to the total weight of the pigment.

Comparison Example 3

Iriodin 6123 Icy White Satin (from Merck, pearlescent pigment based on synthetic mica platelets, $D_{50}$=17 μm).

Comparison Example 4

Hombikat UV 100 (from Sachtleben, nanoscale (<10 nm) UV-active $TiO_2$ pigment in anatase modification).

II Physical Characterization of the Pigments According to the Invention and Pigments of the Comparison Examples IIa Particle Size Measurement The size-distribution curve of the platelet-shaped or spherical non-metallic substrates, of the pigments according to the invention and of the pigments of the comparison examples was determined with the Mastersizer 2000 device (from Malvern) according to the manufacturer's instructions. For this, approx. 0.1 g of the corresponding substrate or pigment as aqueous suspension, without addition of dispersion auxiliaries, was introduced by means of a Pasteur pipette into the sample preparation chamber of the measuring device, accompanied by constant stirring, and measured several times. The average values were generated from the individual measurement results. The scattered light signals were evaluated according to the Fraunhofer method.

By the average particle size $D_{50}$ is meant within the framework of this invention the $D_{50}$ value of the cumulative frequency distribution of the volume-averaged size-distribution function, as obtained by laser diffraction methods. The $D_{50}$ value indicates that 50% of the pigments or of the platelet-shaped or spherical non-metallic substrates have a diameter which is equal to or smaller than the value indicated, for example 20 μm. Correspondingly, the $D_{90}$ value indicates that 90% of the pigments or of the platelet-shaped or spherical non-metallic substrates have a diameter which is equal to or smaller than the respective value. Furthermore, the $D_{10}$ value indicates that 10% of the pigments or of the platelet-shaped or spherical non-metallic substrates have a diameter which is equal to or smaller than the respective value.

IIb Determination of the Loss on Ignition

The loss on ignition of the pigments was determined with the aid of a muffle furnace at 850° C. For this, the pigment was weighed out into an already pre-ignited annealing crucible and heated for 1 h at 850° C. Then, after cooling in a desiccator, the weight loss was ascertained as a percentage.

TABLE 1 loss on ignition

| Example | Loss on ignition [%] |
|---|---|
| Example 2 | 4.2 |
| Example 4 | 2.7 |
| Example 8 | 3.0 |
| Comparison example 1 | 0.5 |
| Comparison example 3 | 0.4 |

IIc Scanning Electron Microscope Images

The average thickness of the platelet-shaped non-metallic substrates and the layer thickness(es) of the pigments according to the invention and of the pigments of the comparison examples were determined with reference to polished cross sections of scanning electron microscope images using a Supra 35 scanning electron microscope (from Zeiss). For this, a resin that is usual in electron microscopy, for example TEMPFIX (Gerhard Neubauer Chemikalien), was applied to a sample plate and heated on a hot plate until it softened. The sample plate was then taken off the hot plate and the respective pigment was scattered onto the softened resin. After the resin had cooled, the respective pigments were fixed almost perpendicularly in the resin. During the scanning electron measurement, the azimuth angle α of the substrates or pigments fixed in the resin relative to a plane normal to the surface was estimated and taken into account during the thickness evaluation according to $h=h_{meas}/\cos\alpha$. To determine the average thickness h, at least 100 particles of the substrates, of the pigments according to the invention and of the pigments of the comparison examples respectively were used.

IId Determination of the Specific Surface Area According to BET

To determine the specific surface area according to BET (device: BELsorp mini II, from BEL), the pigments according to the invention and the pigments of the comparison examples were heated at 300° C. for 2 h and then supplied to the determination, which took place by means of liquid nitrogen.

IIe X-Ray Fluorescence (XRF) Analysis

The metal oxide, metal hydroxide, and/or metal oxide hydrate contents in the pigments according to the invention and in the pigments of the comparison examples were determined as corresponding oxide contents by means of X-ray fluorescence (XRF) analysis.

For this, the pigment was incorporated into a lithium tetraborate glass tablet, fixed in solid sample measuring vessels and measured therefrom. The Advantix ARL device from Thermo Scientific was used as measuring device.

TABLE 2 particle size, metal oxide content, specific surface area according to BET, quotient of specific surface area according to BET and $D_{50}$, layer thickness of the titanium oxide, hydroxide and/or oxide hydrate layer

| Example/ Comparison | Particle size | | | XRF analysis [%] | | BET | $BET/D_{50}$ |
|---|---|---|---|---|---|---|---|
| example | $D_{10}$ | $D_{50}$ | $D_{90}$ | $TiO_2$ | $Ce_2O_3$ | [$m^2/g$] | [m/g] |
| Example 1 | 11.4 | 22.4 | 40.0 | 9.6 | 0.2 | 31.1 | $1.39 \cdot 10^6$ |
| Example 2 | 10.3 | 21.7 | 41.5 | 9.9 | 0.1 | 36.2 | $1.67 \cdot 10^6$ |
| Example 3 | 16.7 | 33.2 | 58.6 | 5.1 | 0.2 | /// | /// |
| Example 4 | 11.7 | 22.6 | 40.3 | 13.2 | 0.1 | 23.3 | $1.03 \cdot 10^6$ |
| Example 5 | 6.4 | 13.8 | 26.9 | 9.6 | 0.2 | 34.8 | $2.52 \cdot 10^6$ |
| Example 6 | 4.9 | 10.4 | 20.2 | 9.4 | 0.2 | 35.8 | $3.43 \cdot 10^6$ |
| Example 7 | 1.0 | 4.6 | 8.2 | ///- | /// | 2.7 | $5.87 \cdot 10^5$ |
| Example 8 | 11.7 | 23.1 | 41.4 | 10.5 | 0.3 | 32.5 | $1.41 \cdot 10^6$ |
| Comparison example 1 | 9.3 | 20.1 | 39.0 | 29.4 | 0.3 | 6.9 | $2.81 \cdot 10^5$ |
| Comparison example 2 | 11.6 | 22.5 | 40.1 | 23.0 | 0.1 | 33.5 | $3.43 \cdot 10^5$ |
| Comparison example 3 | 9.1 | 17.4 | 33.0 | 27.6 | <0.01 | 3.7 | $1.49 \cdot 10^6$ |

IIf Opacity/Determination of the Opacity Quotient

The opacity of the pigments according to the invention and pigments of the comparison examples was determined with reference to varnish applications on black-white opacity charts (Byko Chart 2853, from Byk-Gardner). The respective pigment was stirred into a conventional nitrocellulose varnish (Dr. Renger Erco bronzing mixed varnish 2615e; from Morton) at a level of pigmentation of 6 wt.-%, relative to the total weight of the wet varnish. The respective pigment was provided and then dispersed in the varnish with a brush. The completed varnish was applied with a wet-film thickness of 100 μm to the black-white opacity charts using a doctor-blade drawdown device.

The lightness values L* were measured with a measurement geometry of 110°, relative to the angle of emergence of the light irradiated at 45°, with reference to these varnish applications on the black background and on the white background of the black-white opacity chart, using a BYK-mac device, from Byk-Gardner.

By generating the opacity quotient Dq it is possible to ascertain measured values for the opacity of the pigments that are independent of the base. For this, the quotient of the lightness values on the black background and the lightness values on the white background of the black-white opacity chart is calculated:

$$Dq = \frac{L^*_{110,black}}{L^*_{110,white}}$$

If identical varnish systems are used, the opacity quotient allows the opacities of different pigments to be compared with one another.

The closer the value of the opacity quotient Dq approaches to 0, the more transparent the corresponding pigment appears to an observer, at an identical level of pigmentation in wt.-%. Within the framework of this invention a value of Dq<0.5 for pigments based on platelet-shaped substrates was defined as criterion for a complete transparency. As can be seen from Table 3, the Dq values of the pigments according to the invention based on platelet-shaped substrates lie at <0.5, and thus can barely be perceived by the observer. In the pigment according to the invention from Example 7, which is based on a spherical substrate, a higher opacity quotient was found because of the already high light scattering of the spherical substrate used.

In general, it can be said that the opacity quotient compared with the starting material increases by no more than double due to the coating of the substrates.

IIg Gloss Measurements

The gloss is a measure of the specular reflection and can be characterized precisely using a Micro-Tri-Gloss device. More strongly scattering samples should have a low gloss because of the increased edge scattering and pigment unevennesses.

The varnish applications from IIf "Opacity quotient" on black-white opacity charts (Byko Chart 2853, from Byk-Gardner) were measured with the aid of a Micro-Tri-Gloss glossmeter, from Byk-Gardner, on black base at a measurement angle of 20° relative to the vertical. The gloss values of the pigments according to the invention and pigments of the comparison examples are to be found in Table 3.

TABLE 3 opacity quotient and gloss

| Example/Comparison example | Opacity quotient Dq | Gloss, 20° |
|---|---|---|
| Zero measurement black-white opacity chart | 0.10 | 54.0 |
| Zero measurement black-white opacity chart and nitrocellulose | — | 59.1 |
| Hollow glass microspheres S32 (from 3M) | 0.45 | 7.1 |
| Synthetic mica platelets (FM1040, from Jhejan, China) | 0.20 | 3.3 |
| Example 1 | 0.38 | 2.6 |
| Example 2 | 0.39 | 2.0 |
| Example 3 | 0.28 | 2.4 |
| Example 4 | 0.48 | 4.0 |
| Example 5 | 0.36 | 1.2 |
| Example 6 | 0.36 | 1.0 |
| Example 7 | 0.63 | 0.9 |
| Example 8 | 0.33 | 0.9 |
| Comparison example 1 | 0.82 | 6.7 |
| Comparison example 2 | 0.65 | 5.7 |
| Comparison example 3 | 0.79 | 5.9 |

IIh Color and Chroma Measurements

The color and chroma values of the pigments according to the invention and of the pigments of the comparison examples were determined with reference to the varnish applications from IIf Opacity quotient with the aid of a CM700d spectrophotometer, from Konica Minolta, under standard illuminant D65 in SCE mode. The corresponding values are to be found in Table 2, wherein dE represents the difference from the black-white opacity chart.

TABLE 4

L*a*b* and chroma values

| Example/ Comparison example | Base | L* (D65) | a* (D65) | b* (D65) | C* (D65) | h (D65) | dE |
|---|---|---|---|---|---|---|---|
| Zero measurement black-white opacity chart | white | 91.9 | 0.2 | −2.0 | 2.0 | 276.1 | 0.0 |
| | black | 9.1 | −0.1 | −0.7 | 0.7 | 258.7 | 0.0 |
| Hollow glass microspheres S32 (from 3M) | white | 92.2 | 0.2 | −1.3 | 1.3 | 280.1 | 0.8 |
| | black | 41.8 | −0.1 | −0.7 | 0.7 | 260.8 | 32.7 |
| Synthetic mica platelets (FM1040, from Jhejan, China) | white | 92.2 | 0.2 | −1.6 | 1.6 | 276.0 | 0.5 |
| | black | 18.5 | 0.0 | −0.3 | 0.3 | 265.7 | 9.5 |
| Example 1 | white | 91.9 | 0.0 | −0.3 | 0.3 | 269.5 | 1.7 |
| | black | 35.2 | −0.4 | −9.8 | 9.8 | 267.5 | 27.7 |
| Example 2 | white | 90.4 | 0.2 | 1.7 | 1.8 | 83.8 | 4.0 |
| | black | 34.8 | 0.0 | −8.9 | 8.9 | 269.9 | 27.0 |
| Example 3 | white | 92.3 | 0.1 | −0.9 | 0.9 | 273.0 | 1.2 |
| | black | 25.8 | 0.0 | −5.2 | 5.2 | 270.4 | 17.3 |
| Example 4 | white | 91.2 | 0.1 | 0.1 | 0.1 | 21.9 | 2.1 |
| | black | 43.8 | −1.2 | −11.2 | 11.3 | 264.0 | 36.3 |
| Example 5 | white | 92.6 | 0.1 | −1.0 | 1.0 | 273.4 | 1.3 |
| | black | 33.7 | 0.1 | −7.4 | 7.4 | 270.9 | 25.5 |
| Example 6 | white | 92.8 | 0.1 | −1.0 | 1.0 | 274.4 | 1.4 |
| | black | 33.1 | −0.3 | −7.1 | 7.1 | 267.4 | 24.8 |
| Example 7 | white | 92.3 | −0.1 | 0.0 | 0.1 | 172.5 | 2.1 |
| | black | 58.0 | −1.0 | −4.3 | 4.4 | 257.4 | 49.0 |
| Example 8 | white | 92.7 | −0.1 | −0.4 | 0.4 | 251.1 | 1.8 |
| | black | 30.2 | −0.1 | −1.7 | 1.7 | 265.5 | 21.1 |
| Comparison example 1 | white | 89.0 | −0.1 | 2.9 | 2.9 | 91.9 | 5.7 |
| | black | 72.8 | −2.1 | −4.5 | 5.0 | 245.5 | 63.9 |
| Comparison example 2 | white | 90.3 | 0.1 | −0.2 | 0.2 | 303.0 | 2.4 |
| | black | 58.5 | −2.1 | −5.2 | 5.6 | 247.9 | 49.6 |
| Comparison example 3 | white | 90.5 | 0.0 | 1.3 | 1.3 | 91.8 | 3.6 |
| | black | 71.7 | −2.0 | −5.0 | 5.4 | 247.7 | 62.8 |

The pigments according to the invention proved to be extremely achromatic. This expressed itself as a chroma of <12. Although conventional silver-colored interference pigments also have an equally low chroma, they appear clearly because of their high gloss when observed visually. This can be represented in terms of measurement technology with reference to the high opacity quotients and the higher gloss values at 20°.

IIi UV Resistance on Doctor-Blade Drawdowns

This test was carried out according to the UV rapid test described in EP 0 870 730 to determine the photochemical UV activity of $TiO_2$ pigments. For this, in each case 1.0 g of the pigments according to the invention and of the pigments of the comparison examples were dispersed into 9.0 g of a melamine-containing varnish rich in double bonds. Doctor-blade drawdowns were made on black-white opacity charts (Byko Chart 2853, from Byk-Gardner) and these were dried at room temperature. The doctor-blade drawdowns were divided and in each case one of the two sections was stored in the dark as an unloaded comparison sample. The samples were then irradiated with UV-containing light (UVA-340 lamp, irradiation intensity 1.0 $W/m^2/nm$) for 150 min in a QUV device from Q-Panel. Immediately after completion of the test, color values of the loaded test pieces were ascertained relative to the respective reference sample using a CM-508i colorimeter from Minolta. The resulting ΔE* values, calculated according to the Hunter L*a*b* formula, are shown in Table 5.

In this test, essentially a gray-blue discoloration of the $TiO_2$ layer of the pigment is observed because of Ti(III) centers formed under the influence of UV light. The condition for this is that the electron hole has physically left the $TiO_2$ and—for example due to reaction with olefinic double bonds of the binder—cannot immediately recombine again with the remaining electron. As a melamine-containing varnish layer significantly slows down the diffusion of water (vapor) and oxygen onto the pigment surface, there is a significant delay in reoxidation of the titanium(III) centers, with the result that the graying can be measured and the ΔE value can be used as a measure for the UV stability of the pigments. A higher ΔE* numerical value of the loaded sample relative to the unloaded reference sample thus means a lower UV stability of the examined pigment.

TABLE 5

| Example/Comparison example | ΔE* |
|---|---|
| Example 1 | 5.6 |
| Example 2 | 4.2 |
| Example 4 | 4.6 |
| Example 5 | 7.8 |
| Example 6 | 7.3 |
| Example 7 | 5.0 |
| Example 8 | 5.9 |
| Comparison example 1 | 1.4 |
| Comparison example 2 | 2.5 |
| Comparison example 3 | 4.3 |

IIj Determination of the Binder Decomposition and of the Photocatalytic Activity The pigments according to the invention and the pigments of the comparison examples were incorporated into the transparent coat of protective wood varnish customary in the trade for outdoor areas, Gori 66 Allround wood stain from Dyrup, at 5 wt.-% relative to the total weight of the varnish preparation.

The pigmented protective wood varnishes were applied with a wet-film thickness of 100 μm in each case onto two aluminum sheets by means of a spiral doctor blade and dried/cured for 1 week. One of the coated aluminum sheets was placed in a QUV chamber, from Q-Lab, with alternating cycles of 4 h of UV illumination and 4 h of condensation for 300 h and 800 h.

To measure the self-cleaning, 1 drop of a methylene blue solution in a level of 250 μmol/L was placed onto the surface of the aluminum sheet illuminated at 300 h and 800 h. After the solution had been dried out, the sheets were placed into the QUV testing chamber and exposed to illumination with alternating cycles of 4 h of UV illumination and 4 h of condensation. After 24 h and after 48 h the sheets were examined visually to see how strongly the methylene blue had been decomposed by the varnish film.

As a control sheet, an aluminum sheet coated under identical conditions with the unpigmented protective wood varnish was used which was treated under identical conditions in the QUV chamber.

The results are given in Table 6.

TABLE 6

| Example/ | After 300 h of exposure | | | After 800 h of exposure | |
|---|---|---|---|---|---|
| Comparison example | Without MB | MB after 24 h | MB after 48 h | Without MB | MB after 24 h |
| Control sheet | ○ | 0 | 0 | ○ | 0 |
| Example 1 | ○ | 2 | 2 | – | 2 |
| Example 4 | – | 2 | 3 | – | 3 |
| Example 6 | – | 2 | 2 | – | 2 |
| Example 8 | – | 1 | 2 | – | 2 |
| Comparison example 1 | ○ | 1 | 1 | ○ | 1 |
| Comparison example 3 | –– | 2 | 3 | ––– | Varnish film too strongly damaged |
| Comparison example 4 | Varnish film too strongly damaged | | | No longer carried out | |

MB = methylene blue

Decoloration scale: 0 = no decoloration 1 = slight decoloration 2 = good decoloration 3 = very good decoloration Varnish decomposition ○ = no varnish decomposition – = slight varnish decomposition –– = strong varnish decomposition ––– = very strong varnish decomposition The results from Table 6 show that the pigments according to the invention after 300 h and after 800 h of UV-light exposure have only slightly attacked or decomposed the varnish film. The added methylene blue, on the other hand, was almost completely decomposed.

In comparison, a conventional $TiO_2$-covered pearlescent pigment, such as e.g. the pigment from comparison example 3, has such a strong photoactivity that, in addition to the methylene blue, the varnish film is also very strongly affected. The pigment thus cannot distinguish between "friend and foe" and effects a decomposition of the organic compounds surrounding the pigment.

The strong binder decomposition of the varnish film became even clearer in the case of the extremely photoactive $TiO_2$ particles from comparison example 4, which are usually used in inorganic binder systems, such as for example silicate wall paints.

Comparison example 1 is a weather-stabilized $TiO_2$-containing pearlescent pigment. This one preserves the varnish film the best, with the result that even after 800 h of exposure no binder decomposition was identifiable. However, this pigment was not able to decompose added methylene blue.

The invention claimed is:

1. A pigment comprising a non-metallic substrate, wherein the pigment has at least one barrier layer that selectively absorbs light, electrons, or light and electrons and at least one photocatalytically active layer comprising at least one of titanium oxide, titanium hydroxide and titanium oxide hydrate, wherein the photocatalytically active layer has an average thickness of ≤40 nm, wherein the at least one barrier layer is arranged between the non-metallic substrate and the at least one photocatalytically active layer, wherein the barrier layer comprises at least one of metal oxide, metal hydroxide and metal oxide hydrate, wherein the metal is selected from the group consisting of cerium, zinc and mixtures thereof, wherein the at least one photocatalytically active layer is the outermost inorganic layer, and wherein the barrier layer has a proportion by weight of from 0.1 to less than 5 wt. %, relative to the total weight of the pigment.

2. The pigment according to claim 1, wherein the photocatalytically active layer is selected from the group consisting of titanium oxide, titanium hydroxide, titanium oxide hydrate and mixtures thereof.

3. The pigment according to claim 2, wherein the photocatalytically active layer is doped with carbon, nitrogen, cerium, aluminum, tin, iron and/or zinc.

4. The pigment according to claim 1, wherein the photocatalytically active layer has a proportion by weight of from 2 to less than 30 wt.-%, relative to the total weight of the pigment.

5. The pigment according to claim 1, wherein the photocatalytically active layer has an average layer thickness of from 5 to 40 nm.

6. The pigment according to claim 1, wherein the non-metallic substrate is spherical or platelet-shaped.

7. The pigment according to claim 1, wherein the pigment is spherical and has an average diameter $D_{50}$ of from 10 to 100 μm.

8. The pigment according to claim 1, wherein the pigment is platelet-shaped and has an average diameter $D_{50}$ of from 2 to 65 μm.

9. The pigment according to claim 1, wherein at least one further inorganic layer is arranged between the at least one barrier layer and the at least one photocatalytically active layer.

10. The pigment according to claim 9, wherein the at least one further inorganic layer has a proportion by weight of from 0.1 to less than 10 wt. %, relative to the total weight of the pigment.

11. The pigment according to claim 1, wherein the photocatalytically active layer is organic-chemically modified.

12. The pigment according to claim 10, wherein the non-metallic substrate is platelet-shaped, and has a coating further comprising a second layer (b), wherein the coating, starting from the substrate, consists of the following layers:

(a) at least one of metal oxide(s), hydroxide(s) and metal oxide hydrate(s) of cerium in an amount of from 0.1 to 1.4 wt.-%, relative to the total weight of the pigment, (b) at least one of metal oxide(s), hydroxide(s) and metal oxide hydrate(s) of silicon in an amount of from 0.4 to 2.2 wt.-%, relative to the total weight of the pigment, (c) at least one of metal oxide(s), hydroxide(s) and metal oxide hydrate(s) of titanium in an amount of from 5.2 to 24.0 wt.-%, relative to the total weight of the pigment, and (d) optionally an organic-chemical surface modification.

13. The pigment with a non-metallic substrate according to claim 10, wherein the non-metallic substrate is platelet-shaped, and has a coating further comprising a second layer (b), wherein the coating, starting from the substrate, consists of the following layers:

(a) at least one of metal oxide(s), hydroxide(s) and metal oxide hydrate(s) of zinc in an amount of from 0.3 to 2.9 wt.-%, relative to the total weight of the pigment, (b) at least one of metal oxide(s), hydroxide(s) and metal oxide hydrate(s) of silicon in an amount of from 0.4 to 2.5 wt.-%, relative to the total weight of the pigment, (c) at least one of metal oxide(s), hydroxide(s) and metal oxide hydrate(s) of titanium in an amount of from 4.9 to 22.5 wt.-%, relative to the total weight of the pigment, and (d) optionally an organic-chemical surface modification.

14. A coating agent, wherein the coating agent comprises a pigment according to claim 1.

15. A method for producing a pigment according to claim 1, wherein the method comprises the following steps:

(a) coating a non-metallic substrate with the at least one barrier layer, (b) coating the non-metallic substrate provided with the at least one barrier layer with the at least one photocatalytically active layer.

16. The pigment according to claim 1, wherein the barrier layer consists of metal oxide, metal hydroxide and/or metal oxide hydrate.

17. The pigment according to claim 1, wherein the non-metallic substrate is natural mica platelet, synthetic mica platelet, or glass platelet.

18. The pigment according to claim 12, wherein the non-metallic substrate is natural mica platelet, synthetic mica platelet, or glass platelet.

19. The pigment according to claim 13, wherein the non-metallic substrate is natural mica platelet, synthetic mica platelet, or glass platelet.

20. A pigment comprising a non-metallic substrate, wherein the pigment has at least one barrier layer that selectively absorbs light, electrons, or light and electrons and at least one photocatalytically active layer comprising at least one of titanium oxide, titanium hydroxide and titanium oxide hydrate, wherein the photocatalytically active layer has an average thickness of ≤40 nm, wherein the at least one barrier layer is arranged between the non-metallic substrate and the at least one photocatalytically active layer, wherein the barrier layer comprises at least one of metal oxide, metal hydroxide and metal oxide hydrate, wherein the metal is selected from the group consisting of cerium, zinc and mixtures thereof, wherein the at least one photocatalytically active layer is the outermost inorganic layer, wherein the barrier layer has a proportion by weight of from 0.1 to less than 5 wt. %, relative to the total weight of the pigment, and wherein said pigment is achromatic and does not have a silver interference color.

21. A pigment comprising a non-metallic substrate, wherein the pigment has at least one barrier layer that selectively absorbs light, electrons, or light and electrons and at least one photocatalytically active layer comprising at least one of titanium oxide, titanium hydroxide and titanium oxide hydrate, wherein the photocatalytically active layer has an average thickness of ≤40 nm, wherein the at least one barrier layer is arranged between the non-metallic substrate and the at least one photocatalytically active layer, wherein the barrier layer comprises at least one of metal oxide, metal hydroxide and metal oxide hydrate, wherein the metal is selected from the group consisting of cerium, zinc and mixtures thereof, wherein at least one further inorganic layer is arranged between the at least one barrier layer and the at least one photocatalytically active layer, and the at least one further inorganic layer has a proportion by weight of from 0.1 to less than 10 wt. %, relative to the total weight of the pigment, wherein the non-metallic substrate is platelet-shaped, and has a coating further comprising a second layer (b), wherein the coating, starting from the substrate, consists of the following layers (I) or layers (II), layers (I), (a) at least one of metal oxide(s), hydroxide(s) and metal oxide hydrate(s) of cerium in an amount of from 0.1 to 1.4 wt.-%, relative to the total weight of the pigment, (b) at least one of metal oxide(s), hydroxide(s) and metal oxide hydrate(s) of silicon in an amount of from 0.4 to 2.2 wt.-%, relative to the total weight of the pigment, (c) at least one of metal oxide(s), hydroxide(s) and metal oxide hydrate(s) of titanium in an amount of from 5.2 to 24.0 wt.-%, relative to the total weight of the pigment, and (d) optionally an organic-chemical surface modification, or, layers (II), (a) at least one of metal oxide(s), hydroxide(s) and metal oxide hydrate(s) of zinc in an amount of from 0.3 to 2.9 wt. %, relative to the total weight of the pigment, (b) at least one of metal oxide(s), hydroxide(s) and metal oxide hydrate(s) of silicon in an amount of from 0.4 to 2.5 wt. %, relative to the total weight of the pigment, (c) at least one of metal oxide(s), hydroxide(s) and metal oxide hydrate(s) of titanium in an amount of from 4.9 to 22.5 wt. %, relative to the total weight of the pigment, and (d) optionally an organic-chemical surface modification.

* * * * *